(12) United States Patent
Fleming, III

(10) Patent No.: US 6,631,185 B1
(45) Date of Patent: Oct. 7, 2003

(54) METHOD AND APPARATUS FOR COMPARING COMMUNICATION SERVICE PLANS BASED ON USAGE STATISTICS

(75) Inventor: Hoyt A. Fleming, III, Boise, ID (US)

(73) Assignee: Micron Technology Inc., Boise, ID (US)

( * ) Notice: Subject to any disclaimer, the term of this patent is extended or adjusted under 35 U.S.C. 154(b) by 405 days.

(21) Appl. No.: 09/602,204

(22) Filed: Jun. 22, 2000

(51) Int. Cl.7 .............................................. H04M 15/00
(52) U.S. Cl. ................ 379/121.02; 379/114.1; 379/114.12; 379/124; 379/126
(58) Field of Search ............................ 379/111, 112.01, 379/112.07, 114.01, 114.02, 114.03, 114.05, 114.13, 121.02, 121.06, 114.1, 114.12, 124, 126

(56) References Cited

U.S. PATENT DOCUMENTS

| | | | | |
|---|---|---|---|---|
| 5,659,601 A | * | 8/1997 | Cheslog .................... 455/406 |
| 6,125,173 A | * | 9/2000 | Jagadish et al. ............ 379/112 |
| 6,317,490 B1 | * | 11/2001 | Cameron et al. ...... 379/114.01 |

* cited by examiner

Primary Examiner—Binh Tieu
(74) Attorney, Agent, or Firm—Park, Vaughan & Fleming LLP

(57) ABSTRACT

One embodiment of the present invention provides a system that automatically determines which communication service plan is the most cost effective for a communication device. The system operates by receiving usage statistics for the communication device, as well as a set of available service plans for the communication device. The system uses the usage statistics to calculate charges for the available service plans in order to determine the most cost-effective service plan, and then communicates results of the determination to an interested party. In one embodiment of the present invention, the system charges the interested party a fee for providing the results of the determination. In one embodiment of the present invention, the system additionally receives a request to switch a current service plan to an alternate service plan, and then switches the current service plan to the alternate service plan. In one embodiment of the present invention, the system additionally displays an ad to the interested party and collects advertising revenue for the advertisement.

42 Claims, 2 Drawing Sheets

METHOD AND APPARATUS FOR COMPARING COMMUNICATION SERVICE PLANS BASED ON USAGE STATISTICS

BACKGROUND

1. Field of the Invention

The present invention relates to communication devices, such as cellular telephones, and their service plans. More specifically, the present invention relates to a method and apparatus for determining the most cost-effective service plan for a communication device, and then switching to that service plan.

2. Related Art

The rapid growth of the telecommunications and the cellular communication markets has led to intense competition. New competitors and services are springing up on almost a daily basis. Consequently, it is becoming increasingly harder to keep informed about this ever-changing market.

Presently, communications customers select a basic service plan based on their anticipated needs. These plans include many different devices—cell phones, pagers, and hand-held computers to name a few—and there are numerous options and contract types available. Some companies offer free minutes and others offer long distance. Still others offer free minutes outside of their network. All of these companies offer promotions and provide new gimmicks to entice customers to choose their service over the rest.

The main challenge for the customer is to determine which service plan is most cost-effective for the amount of usage that the customer experiences over a given time period. There are thousands of service plans available at any given time, and very few individuals, if any at all, actually take the time to figure what their charges would be under the numerous service plans that are available or become available. However, once a customer chooses a plan, the customer typically does not continue to make comparisons between service plans as the service plans and the customer's usage patterns change over time. Hence, a customer can spend months overpaying for service when a cheaper alternative exists.

What is needed is a method and an apparatus that allows a customer to easily compare service plan options for a communication device based upon the customer's actual usage of the communication device in order to determine the most cost-effective service plan.

SUMMARY

One embodiment of the present invention provides a system that automatically determines which communication service plan is the most cost effective for a communication device. The system operates by receiving usage statistics for the communication device, as well as a set of available service plans for the communication device. The system uses the usage statistics to calculate charges for the available service plans in order to determine the most cost-effective service plan, and then communicates results of the determination to an interested party.

In one embodiment of the present invention, the system charges the interested party a fee for providing the results of the determination.

In one embodiment of the present invention, the system includes the costs of switching service plans in determining the most cost-effective service plan.

In one embodiment of the present invention, the system additionally receives a request to switch a current service plan to an alternate service plan, and then switches the current service plan to the alternate service plan.

In one embodiment of the present invention, the system charges the interested party a fee if the service plan is switched.

In one embodiment of the present invention, the system charges the service provider a referral fee if the service plan is switched to a plan provided by that service provider.

In one embodiment of the present invention, the system additionally displays an ad to the interested party and collects advertising revenue for the advertisement.

In one embodiment of the present invention, the system receives the set of service plans from a database.

In one embodiment of the present invention, the available service plans are all offered by the same service provider.

In one embodiment of the present invention, the available service plans are offered by numerous service providers.

In one embodiment of the present invention, the interested party is the account holder for the communication device.

In one embodiment of the present invention, the interested party is a third party other than the account holder for the communication device.

In one embodiment of the present invention, the system receives the statistics on measured usage of the account electronically.

In one embodiment of the present invention, the system receives the statistics on measured usage of the account through manual input.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Systems

Figure 1:
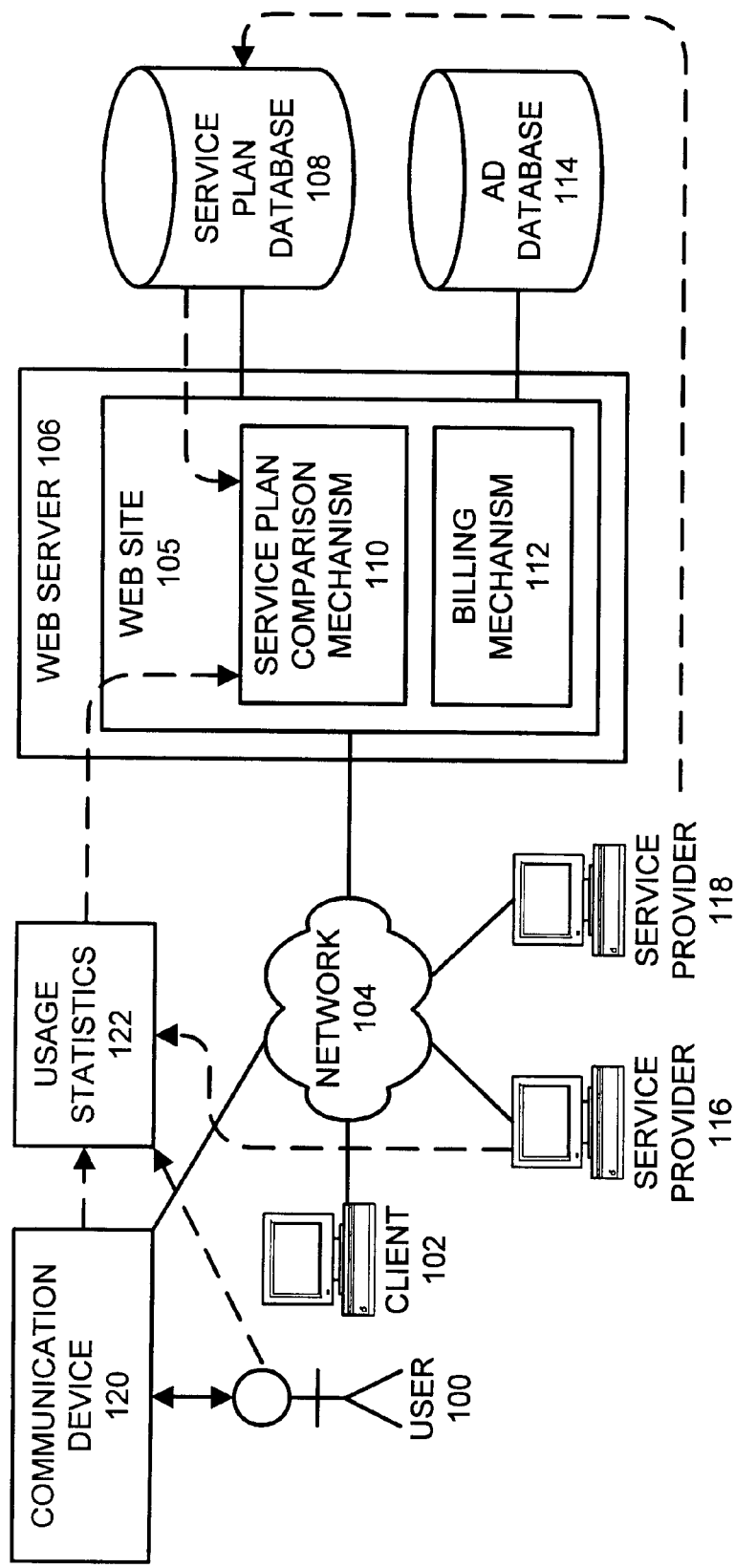
FIG. 1 illustrates computer systems coupled together by a network in accordance with an embodiment of the present invention.

FIG. 1 illustrates computer system 102, web server 106, and service providers computer systems 116–118 coupled together by network 104 in accordance with an embodiment of the present invention. Network 104 can include any type of wire or wireless communication channel capable of coupling together computer systems. This includes, but is not limited to, a local area network, a wide area network, or a combination of networks. In one embodiment of the present invention, network 104 includes the Internet. Network 104 can also include a communication pathway through a telephone line.

The computer systems illustrated in FIG. 1 include client 102, web server 106 and service provider computer systems 116 and 118. Note that computer systems 102, 106, 116 and 118 can generally include any type of computer system, including, but not limited to, a computer system based on a microprocessor, a mainframe computer, a digital signal processor, a personal organizer, a device controller, a cellular phone, or a computational engine within an appliance.

Client 102 can generally include any node on network 104 including computational capability and including a mechanism for communicating across network 104. Client 102 is operated by user 100, who also operates communication device 120.

Communication device 120 can generally include any type of communication device the use of which requires periodic payments through a service plan. For example, communication device 120 can include, but is not limited to a telephone, a cellular telephone, a pager, a computer system, a portable computer system, a personal organizer and a computational device within an appliance.

Web server 106 can generally include any computational node including a mechanism for servicing requests from a client for computational and/or data storage resources.

Web server 106 facilitates the operation of web site 105, which contains inter-linked pages of textual and graphical information that can be viewed through a web browser on a remote machine, such as client 102. Web server 106 facilitates comparisons of service plans for communication devices, such as communication device 120.

Web site 105 includes service plan comparison mechanism 110 and billing mechanism 112. Service plan comparison mechanism 110 receives usage statistics 122 for communication device 120, as well as service plan information from service plan database 108. Service plan comparison mechanism 110 uses these inputs to produce a comparison result as is described below in more detail with reference to FIG. 2.

Billing mechanism generates bills for usage of web site 105. These bills can be sent to a number of different entities, including user 100 and the owners of service provider computer systems 116 and 118, as well as advertisers who display advertisements on web site 105.

Note that web server is coupled to service plan database 108 and ad database 114. Service plan database 108 can generally include any type of system that can store data for a set of available service plans. Ad database 114 can generally include any type of system that can store advertisements for display on web site 105. Note that service plan database 108 and ad database 114 may exist within another computer system, such as web server 106, or alternatively, may exist in a stand-alone computer system.

Service provider computer systems 116 and 118 can generally include any computer systems belonging to providers of service plans for communication devices. For example, if the communication device is a cellular telephone, service provider computer systems 116 and 118 belong to providers of cellular telephone service.

Process of Changing Service Plans

Figure 2:
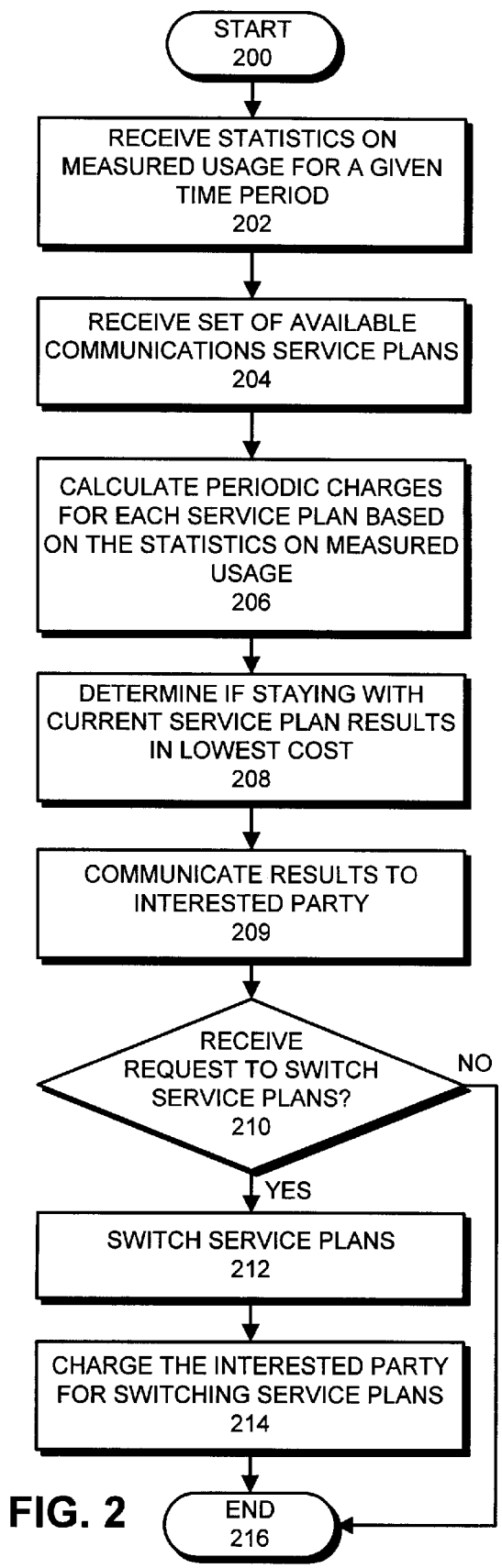
FIG. 2 is a flow chart illustrating the process of automatically changing service plans based upon usage statistics in accordance with an embodiment of the present invention.

FIG. 2 is a flow chart illustrating how the current service plan is determined in accordance with an embodiment of the present invention. Note that this process can take place at a number of different locations, including within web server 106 or within any other computer system that is capable of performing the process. Alternatively, the process can be partitioned across multiple computer systems.

In one embodiment of the present invention, the system starts by receiving usage statistics 122 for communication device 120 for a given time period (202). As is illustrated in FIG. 1, these usage statistics 122 can be received from communication device 120, from user 100 or from service provider computer system 116. For example, user 100 can manually input usage statistics 122 from a billing statement for communication device 120, or alternatively service provider computer system 116 can provide usage statistics 122 in electronic form.

Next, the system receives the set of available service plans from service plan database 108 (204). Note that these available service plans can be provided by service provider computer systems 116 and 118. Also note that the set of available service plans can include plans from only a single service provider, or alternatively, for multiple service providers.

After the system receives this information, service plan comparison mechanism 10 calculates the periodic charges for each service plan based on usage statistics 122 (206). These calculated periodic charges are used to determine if staying with the current service plan results in a lower cost than switching to an alternate service plan (208). Note that the cost of switching service plans can be factored into this determination. The results of this determination are then communicated to an interested party (209). Note that this interested party can include user 100 or the provider of the alternative service plan.

Next, if the system receives a request to switch service plans (210), the system switches the service plan to the alternate service plan (212). The system may additionally charge the interested party a fee for switching service plans (214). For, example the system may charge the service provider for the alternate service plan a fee for causing user 100 to switch to the alternate service plan.

Note that the owner of web site 105 can also post advertisements on web site 105 from ad database 114. This allows the owner of web site 105 to collect advertising revenue from companies who provide the advertisements.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for comparing communication service plans for a communication device based on statistics on measured usage for the communication device, comprising:

receiving statistics on measured usage of the communication device during a time period;

receiving a set of available service plans for the communication device;

calculating periodic charges for each service plan from the set of available service plans based on the statistics on measured usage;

determining if staying with a current service plan from the set of available service plans results in a lower cost than switching from the current service plan;

communicating results of the determination to an interested party; and charging the interested party for providing the results of the determination.

2. The method of claim 1, further comprising:

displaying an advertisement to the interested party; and collecting a fee for displaying the advertisement.

3. The method of claim 1, wherein determining if staying with the current service plan results in a lower cost includes factoring in costs associated with switching the current service plan.

4. The method of claim 1, further comprising receiving a request to switch the current service plan to an alternate service plan.

5. The method of claim 4, further comprising switching the current service plan to the alternate service plan.

6. The method of claim 1, further comprising charging the interested party if the current service plan is switched.

7. The method of claim 1, further comprising charging a service provider a referral fee if the current service plan is switched to a plan provided by the service provider.

8. The method of claim 1, wherein the set of available service plans is received from a database.

9. The method of claim 1, wherein the set of available service plans includes service plans from the same service provider.

10. The method of claim 1, wherein the set of available service plans includes service plans from a plurality of service providers.

11. The method of claim 1, wherein the interested party is an account holder for the communication device.

12. The method of claim 1, wherein the interested party is a third party other than an account holder for the communication device.

13. The method of claim 1, wherein the statistics on measured usage of the communication device are received electronically.

14. The method of claim 1, wherein the statistics on measured usage of the communication device are received through manual input.

15. A computer-readable storage medium storing instructions that when executed by a computer cause the computer to perform a method for comparing communication service plans for a communication device based on statistics on measured usage for the communication device, the method comprising:

receiving statistics on measured usage of the communication device during a time period;

receiving a set of available service plans for the communication device;

calculating periodic charges for each service plan from the set of available service plans based on the statistics on measured usage;

determining if staying with a current service plan from the set of available service plans results in a lower cost than switching from the current service plan;

communicating results of the determination to an interested party; and charging the interested party for providing the results of the determination.

16. The computer-readable storage medium of claims 15, wherein the method further comprises displaying an advertisement to the interested party and collecting a fee for displaying the advertisement.

17. The computer-readable storage medium of claim 15, wherein determining if staying with the current service plan results in a lower cost includes factoring in costs associated with switching the current service plan.

18. The computer-readable storage medium of claim 15, wherein the method further comprises receiving a request to switch the current service plan to an alternate service plan.

19. The computer-readable storage medium of claim 18, wherein the method further comprises switching the current service plan to the alternate service plan.

20. The computer-readable storage medium of claim 15, wherein the method further comprises charging the interested party if the current service plan is switched.

21. The computer-readable storage medium of claim 15, wherein the method further comprises charging a service provider a referral fee if the current service plan is switched to a plan provided by the service provider.

22. The computer-readable storage medium of claim 15, wherein the set of available service plans is received from a database.

23. The computer-readable storage medium of claim 15, wherein the set of available service plans includes service plans from the same service provider.

24. The computer-readable storage medium of claim 15, wherein the set of available service plans includes service plans from a plurality of service providers.

25. The computer-readable storage medium of claim 15, wherein the interested party is an account holder for the communication device.

26. The computer-readable storage medium of claim 15, wherein the interested party is a third party other than an account holder for the communication device.

27. The computer-readable storage medium of claim 15, wherein the statistics on measured usage of the communication device are received electronically.

28. The computer-readable storage medium of claim 15, wherein the statistics on measured usage of the communication device are received through manual input.

29. An apparatus that compares communication service plans for a communication device based on statistics on measured usage for the communication device, the apparatus comprising:

an input mechanism that is configured to receive statistics on measured usage of the communication device during a time period;

wherein the input mechanism is additionally configured to receive a set of available service plans for the communication device;

a calculation mechanism that calculates periodic charges for each service plan from the set of available service plans based on the statistics on measured usage;

a determination mechanism that determines if staying with a current service plan results in a lower cost than switching from the current service plan;

a communication mechanism that communicates results of the determination to an interested party; and a billing mechanism that is configured to charge the interested party for providing the results of the determination.

30. The apparatus of claim 29, further comprising a display mechanism that is configured to display an advertisement to the interested party and to collect a fee for displaying the advertisement.

31. The apparatus of claim 29, wherein the determination mechanism is configured to factor in costs associated with switching the current service plan.

32. The apparatus of claim 29, wherein the input mechanism is additionally configured to receive a request to switch the current service plan to an alternate service plan.

33. The apparatus of claim 32, further comprising a switching mechanism that is configured to switch the current service plan to the alternate service plan.

34. The apparatus of claim 29, further comprising a billing mechanism that is configured to charge the interested party if the current service plan is switched.

35. The apparatus of claim 29, further comprising a billing mechanism that is configured to charge a service provider a referral fee if the current service plan is switched to a plan provided by the service provider.

36. The apparatus of claim 29, wherein the input mechanism is configured to receive the set of available service plans from a database.

37. The apparatus of claim 29, wherein the set of available service plans includes service plans from the same service provider.

38. The apparatus of claim 29, wherein the set of available service plans includes service plans from a plurality of service providers.

39. The apparatus of claim 29, wherein the interested party is an account holder for the communication device.

40. The apparatus of claim 29, wherein the interested party is a third party other than an account holder for the communication device.

41. The apparatus of claim 29, wherein the input mechanism is configured to receive the statistics on measured usage of the communication device electronically.

42. The apparatus of claim 29, wherein the input mechanism is configured to receive the statistics on measured usage of the communication device through manual input.

* * * * *